(12) United States Patent
Blaser et al.

(10) Patent No.: US 11,568,520 B2
(45) Date of Patent: Jan. 31, 2023

(54) METHOD AND DEVICE FOR INPAINTING OF COLOURISED THREE-DIMENSIONAL POINT CLOUDS

(71) Applicant: LEICA GEOSYSTEMS AG, Heerbrugg (CH)

(72) Inventors: Daniel Blaser, Sulgen (CH); Richard Fetzel, Bürs (AT); Bianca Gordon, Rebstein (CH); Marco Schröder, Neukirch (CH); Bernd Walser, Heerbrugg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 413 days.

(21) Appl. No.: 15/879,303

(22) Filed: Jan. 24, 2018

(65) Prior Publication Data

US 2018/0211367 A1    Jul. 26, 2018

(30) Foreign Application Priority Data

Jan. 24, 2017    (EP) .................................... 17152842

(51) Int. Cl.
*G06T 5/00*        (2006.01)
*G06T 7/30*        (2017.01)
(Continued)

(52) U.S. Cl.
CPC ............... *G06T 5/005* (2013.01); *G01C 1/04* (2013.01); *G01C 15/002* (2013.01); *G01S 17/42* (2013.01);
(Continued)

(58) Field of Classification Search
CPC .................... G01C 15/002; G01C 1/04; G06T 2207/10028; G06T 5/005
See application file for complete search history.

(56) References Cited

U.S. PATENT DOCUMENTS 7,860,299 B2 * 12/2010 Chaperon ............... G06T 17/30
382/154
8,411,931 B2 *  4/2013 Zhou .................... H04N 13/139
382/154
(Continued)

FOREIGN PATENT DOCUMENTS

CN           106780586 A   *  5/2017
DE     20 2013 001538 U1      3/2013
(Continued)

OTHER PUBLICATIONS

Gregg Jackson and Gregory Lepere, Inside Trimble TX6 and TX8 Color Acquisition, Mar. 2, 2017, https://upgsolutions.com/docs/WP_Inside%20Trimble%20TX6.pdf, p. 1-9 (Year: 2017).*

(Continued)

*Primary Examiner* — Gandhi Thirugnanam
(74) *Attorney, Agent, or Firm* — Maschoff Brennan (57) ABSTRACT

A method for colourising a three-dimensional point cloud including surveying a point cloud with a surveying instrument. Each point of the point cloud may be characterised by coordinates within an instrument coordinate system having an instrument center. The method may include capturing a first image of the setting with a first camera. Each pixel value of the first image is assigned coordinates within a first camera coordinate system having a first projection center as origin and a first parallax shift relative to the instrument center. The method may include transforming the point cloud from the instrument coordinate system into the first camera coordinate system, resulting in a first transformed point cloud, detecting one or more uncovered points within the first transformed point cloud which are openly visible from the first projection center, and for each uncovered point, assigning a pixel value having corresponding coordinates in the first camera coordinate system.

17 Claims, 4 Drawing Sheets

(51) Int. Cl.
*G01S 17/42* (2006.01)
*G01C 15/00* (2006.01)
*G01C 1/04* (2006.01)

(52) U.S. Cl.
CPC ...... *G06T 7/30* (2017.01); *G06T 2207/10004* (2013.01); *G06T 2207/10024* (2013.01); *G06T 2207/10028* (2013.01); *G06T 2207/30181* (2013.01)

(56) References Cited

U.S. PATENT DOCUMENTS

| | | | | |
|---|---|---|---|---|
| 9,070,216 | B2* | 6/2015 | Golparvar-Fard | G06T 19/006 |
| 9,870,624 | B1* | 1/2018 | Narang | G06T 7/74 |
| 2004/0150641 | A1* | 8/2004 | Duiker | G06T 15/20 |
| | | | | 345/426 |
| 2010/0157280 | A1* | 6/2010 | Kusevic | G01S 7/4972 |
| | | | | 356/4.01 |
| 2010/0239180 | A1* | 9/2010 | Yea | G06T 5/002 |
| | | | | 382/261 |
| 2010/0239187 | A1* | 9/2010 | Yea | G06T 5/005 |
| | | | | 382/298 |
| 2011/0115812 | A1* | 5/2011 | Minear | G09G 5/02 |
| | | | | 345/593 |
| 2012/0070077 | A1* | 3/2012 | Ossig | G01S 17/86 |
| | | | | 382/164 |
| 2013/0293568 | A1* | 11/2013 | Sano | H04N 1/56 |
| | | | | 345/600 |
| 2014/0063489 | A1* | 3/2014 | Steffey | G01B 11/24 |
| | | | | 356/72 |
| 2014/0125767 | A1* | 5/2014 | Bell | H04N 13/10 |
| | | | | 348/46 |
| 2015/0193963 | A1* | 7/2015 | Chen | G06V 20/13 |
| | | | | 345/426 |
| 2015/0341552 | A1* | 11/2015 | Chen | G06T 11/60 |
| | | | | 348/38 |
| 2016/0061954 | A1* | 3/2016 | Walsh | G01S 17/89 |
| | | | | 356/139.03 |
| 2016/0187486 | A1* | 6/2016 | Chen | G01S 17/86 |
| | | | | 702/94 |
| 2016/0189348 | A1* | 6/2016 | Canter | G06T 19/20 |
| | | | | 382/154 |
| 2016/0266256 | A1* | 9/2016 | Allen | G01C 21/26 |
| 2016/0314593 | A1* | 10/2016 | Metzler | G01C 15/002 |
| 2017/0188002 | A1* | 6/2017 | Chan | G06V 10/28 |
| 2017/0307370 | A1* | 10/2017 | Tanaka | G01C 1/02 |
| 2018/0033146 | A1* | 2/2018 | Bleyer | G06V 10/145 |
| 2018/0033160 | A1* | 2/2018 | Ishigami | G06T 7/74 |
| 2018/0074203 | A1* | 3/2018 | Zermas | G06N 20/00 |
| 2018/0108176 | A1* | 4/2018 | Yon | G06T 17/00 |
| 2018/0139431 | A1* | 5/2018 | Simek | H04N 5/2258 |
| 2018/0211367 | A1* | 7/2018 | Blaser | G01C 15/002 |
| 2018/0262737 | A1* | 9/2018 | Monnier | G06T 15/20 |

FOREIGN PATENT DOCUMENTS

| | | | | |
|---|---|---|---|---|
| EP | 3 086 283 | A1 | 10/2016 | |
| EP | 3351899 | A1* | 7/2018 | G01C 1/04 |
| EP | 3425333 | A1* | 1/2019 | G01C 11/02 |
| WO | 2008/107720 | A1 | 9/2008 | |
| WO | WO-2019210360 | A1* | 11/2019 | G06F 5/00 |

OTHER PUBLICATIONS

Gregg Jackson and Gregory Lepere, Inside Trimble TX6 and TX8—Deep Dive into Lightning Technology, Dec. 8, 2016, https://upgsolutions.com/docs/WP_Inside%20Trimble%20TX8.pdf, p. 1-16 (Year: 2016).*
"Trimble Expands 3D Laser Scanning Portfolio with Addition of New TX6 and Improved TX8",2016, https://www.trimble.com/news/release.aspx?id=101116a (Year: 2016).*
Geospatial Media, The Trimble TX6 is a cost effective 3D scanning solution, Nov. 4, 2016, Geospatial world, Intergeo 2016, https://www.geospatialworld.net/videos/trimble-tx6-cost-effective-3d-scanning-solution/ (Year: 2016).*
Trimble Geospatial, Trimble TX8 Laser Scanner—Customer Testimonial—ECO3D, Jan. 24, 2017, https://www.youtube.com/watch?v=nKekVXxpBzA, (Year: 2017).*
User Guide Trimble TX6/TX8 3D Laser Scanner, Oct. 2016, p. 1-116 (Year: 2016).*
User Guide Trimble Realworks 10.2, Trimble, Oct. 11, 2016, p. 1-1678 (Year: 2016).*
Release Notes Trimble Realworks Software Version 10.2, Oct. 2016, https://trl.trimble.com/docushare/dsweb/Get/Document-827447/Trimble_RealWorks_10.2_RELEASE-NOTES_ENG_20161011.pdf (Year: 2016).*
EP Search Report dated Jul. 12, 2017 as received in Application No. 17152842.5.
Sun et al., "An automatic 3D point cloud registration method based on regional curvature maps" Image and Vision Computing, Oct. 27, 2016.
Wu et al., "Automatic cloud detection for high resolution satellite stereo images and its application in terrain extraction" ISPRS Journal of Photogrammetry and remote Sensing, Oct. 12, 2016.
Ka et al., "Automatic generation of three dimensional colored point clouds based on multi-view image matching", Optics and Precision Engineering, vol. 21, No. 7, Jul. 2013.
Yan et al., "Image dense matching technique assisted extraction of point cloud by 3D laser scanner", China Academic Journal Electronic Publishing House, Apr. 16, 2014.
CN Search Report in Application No. 201810062536.4 dated Feb. 3, 2021.

* cited by examiner

METHOD AND DEVICE FOR INPAINTING OF COLOURISED THREE-DIMENSIONAL POINT CLOUDS

CROSS-REFERENCE TO RELATED APPLICATIONS

This application claims priority to European Patent Application No. 17152842.5 filed on Jan. 24, 2017. The foregoing patent application are incorporated herein by reference.

FIELD OF INVENTION

The present invention relates generally to a surveying instrument and more particularly to systems and methods of inpainting colourised three-dimensional (3D) point clouds using a surveying instrument.

BACKGROUND

Generating three-dimensional point clouds is used to survey many different settings such as construction sites, building facades, industrial facilities, interior of houses, or any other applicable setting. The surveys achieved therewith may be used to obtain accurate three-dimensional (3D) models of a setting, wherein the models consist of point clouds. The points of such a cloud are stored by coordinates in a coordinate system, which may be defined by a surveying instrument which recorded the point cloud. Usually, the surveying instrument constitutes the origin of the coordinate system by an instrument center, in particular by the so called nodal point of the surveying instrument. The points are usually surveyed by associating a distance measured with a laser beam (with help of a time-of-flight method) with the alignment under which the distance was measured. Usually, the coordinate system is a spherical coordinate system, such that a point is characterised by a distance value, an elevation angle and an azimuth angle with reference to the origin of the coordinate system.

Common surveying instruments comprise a unit for sending out a scanning beam and for receiving the reflected beam in order to measure the distance of a point the beam was directed at. Usually, these surveying instruments furthermore comprise means to rotatably alter the direction of the beams, commonly a vertical rotation axis and a horizontal rotation axis, wherein both axes are sensed with angle sensors. Usually, the rotation of the vertical axis is measured by an azimuth angle and the rotation of the horizontal axis is measured by an elevation angle. If the surveying instrument is embodied as a laser scanner, one of said axes may be a slow axis and the other one a fast axis.

The distances may be calculated with the travel time measurement (time-of-flight) method by observing the time between sending out and receiving a signal. The alignment angles are achieved with said angle sensors arranged at the vertical axis and at the horizontal axis.

In order to provide a graphically more ergonomic visualization, the point cloud may be digitally colourised. In various applications, terrestrial surveying is hence supported by imaging data of at least one camera which is combined with a surveying instrument by including the camera in the instrument or mounting it on the same platform as the instrument.

Such point cloud colourisations are known in prior art and for example described in US20140063489A1, US2016061954A1 and US20120070077A1.

However, prior art offers only complicated solutions to solve parallax errors which occur due to different perspectives of a camera and a surveying instrument. For example, according to US20140063489A1, the camera is incorporated inside a laser scanner and components are arranged such that the camera and the scanner have the same perspective. This construction requires a high technical effort and is therefore very expensive. According to US20120070077A1, a camera is a posteriori brought into the same position where the surveying instrument had been to scan the environment. This process requires extra high precision of the components.

BRIEF DESCRIPTION OF THE INVENTION

It is therefore an object of some embodiments of the present invention to provide an alternative, in particular an improved, surveying instrument and method therefore, allowing for a correct colourisation of a point cloud surveyed with the surveying instrument.

If a camera on a surveying instrument is placed off-axis, this off-axis placement will cause parallax. As a consequence an incorrect colourisation may happen. The parallax effect takes place at regions where the camera "looks at" a different part of the measured setting than the surveying instrument did. In order to avoid incorrect colourisation due to the camera's parallax, an algorithm for identifying these particular regions is implemented including the use of 3D data. In case no matching colour is available for a scan point, it may be coloured based on or by a colour from surrounding points. The colour may be estimated by use of the distance or the intensity of the 3D point in question as well as the adjacent colours. This process is called In-painting.

3D points and corresponding image pixels, which are affected by parallax, are detected using projective geometry. The 3D points and corresponding image pixels may be corrected by filling them based on adjacent colours. These colours may be selected based on properties of the reflected laser light (e.g. intensity, distance, and Signal-to-Noise-Ratio) from the corresponding 3D points.

The detection of parallax points and the used In-painting algorithm allows having camera sensors outside the nodal point without false colourised scan points, and using cameras outside the nodal point eases the placing of the cameras and optic design.

Some embodiments of the invention relate to a method for colourising a three-dimensional point cloud. The method includes, with a surveying instrument, surveying a point cloud of a setting, wherein each point of said point cloud is characterised by coordinates within an instrument coordinate system, which has an instrument center as origin. The method further includes with a first camera comprised by the surveying instrument, capturing a first image of the setting, wherein each pixel value of the first image is assigned to coordinates within a first camera coordinate system, which has a first projection center as origin, wherein the first projection center has first parallax shift relative to the instrument center. With a computer, transforming the point cloud from the instrument coordinate system into the first camera coordinate system, resulting in a first transformed point cloud, and within the first transformed point cloud, detecting one or more uncovered points, which are openly visible from the perspective of the first projection center. In other words, uncovered points are those which have a direct line of sight with the first projection center. To each uncovered point in the first transformed point cloud, assigning a pixel value, which has corresponding coordinates in the first camera coordinate system. By the assignment of pixels, the point cloud can be considered as colourised. Optionally, the colourised point cloud can then be re-transformed from the first camera coordinate system into the instrument coordinate system.

The computer may be incorporated into the surveying instrument, or be embodied as a cloud computer, a smart phone or a tablet PC. The instrument center, which is the point of origin to the point cloud within the instrument coordinate system, may be referred to as the "nodal point" of the surveying instrument. Not necessarily, but optionally, the nodal point may be defined by a crossing point of the azimuth axis and the elevation axis of the surveying instrument. However, the instrument center (or "nodal point") may be arbitrarily positioned, such that it is a virtual point not stuck to a physical object. For example, the instrument center may be inside or on a beam directing unit of the surveying instrument, or it may be positioned "in the air" around or within the surveying instrument structure.

In an embodiment, the method further comprises: With the computer, within the first transformed point cloud, detecting one or more covered points, which are non-visible from the perspective of the first projection center due to the first parallax shift, and to each covered point of the first transformed point cloud, assigning a substitute pixel value, which is determined based on a pixel value assigned to a point adjacent to the covered point of the first transformed point cloud. Said point adjacent to the covered point may be an uncovered or it may be itself a covered point which a substitute pixel value already has been assigned to.

Detecting covered points takes account of how the visibility has been before the perspective shift (transformation of the point cloud). For example, if a point cluster (recognized as a plane surface) has to be "pierced" through to reach a specific point, then that specific point may be detected as a covered point.

In a further embodiment, the method may comprise the steps:

With a second camera comprised by the surveying instrument, capturing a second image of the setting, wherein each pixel value of the second image is assigned to coordinates within a second camera coordinate system, which has a second projection center as origin, wherein the second projection center has second parallax shift relative to the instrument center.

With the computer:

Transforming the point cloud from the instrument coordinate system into the second camera coordinate system, resulting in a second transformed point cloud.

Within the second transformed point cloud, detecting one or more uncovered points, which are openly visible from the perspective of the second projection center.

To each uncovered point in the second transformed point cloud, assigning a pixel value, which has corresponding coordinates in the second camera coordinate system.

In another embodiment of the method, with help of the computer, the following steps are performed:

Within the second transformed point cloud, detecting one or more covered points, which are non-visible from the perspective of the second projection center due to the second parallax shift.

To each covered point of the second transformed point cloud, assigning a substitute pixel value, which is determined based on a pixel value assigned to a point adjacent to the covered point of the second transformed point cloud.

Further, the method may comprise:

With a second camera comprised by the surveying instrument, capturing a second image of the setting, wherein each pixel value of the second image is assigned to coordinates within a second camera coordinate system, which has a second projection center as origin, wherein the second projection center has second parallax shift relative to the instrument center.

With the computer:

Transforming the point cloud from the instrument coordinate system into the second camera coordinate system, resulting in a second transformed point cloud.

Within the first transformed point cloud, detecting one or more covered points, which are non-visible from the perspective of the first projection center due to the first parallax shift.

Within the second transformed point cloud, determining corresponding points of said one or more covered points of the first transformed point cloud.

Within the corresponding points, detecting one or more uncovered corresponding points, which are openly visible from the perspective of the second projection center.

To each covered point in the first transformed point cloud, of which an uncovered corresponding point exists in the second transformed point cloud, assigning a pixel value of the second image that has corresponding coordinates with the uncovered corresponding point of the second transformed point cloud.

At least one of the first camera and the second camera may be one of a wide angle camera, a panoramic camera, and a spherical camera.

At least one of the coordinates of the pixel values, the coordinates of the points of the point cloud, the coordinates of the points of the first transformed point cloud, and the coordinates of the points of the second transformed point cloud may comprise at least an elevation angle and an azimuth angle.

At least one of the coordinates of the points of the point cloud, the coordinates of the points of the first transformed point cloud, and the coordinates of the points of the second transformed point cloud may comprise an elevation angle, an azimuth angle and a distance value.

Each pixel value of the first image may be assigned to coordinates within the first camera coordinate system based at least on a focal length of the first camera. Accordingly, each pixel value of the second image may be assigned to coordinates within the second camera coordinate system based at least on a focal length of the second camera.

At least one of the uncovered points and the covered points are detected based on an detection algorithm using one of 3D point projection, plane detection, feature detection and object detection.

The invention also relates to a surveying instrument for generating point clouds within an instrument coordinate system having an instrument center as origin.

The surveying instrument may comprise a base, a body mounted on the base such that the body is rotatable relative to the base about an azimuth axis, a beam directing unit mounted in the body such that the beam directing unit is rotatable relative to the body about an elevation axis, wherein the beam directing unit may be configured to direct a transmission beam towards a setting, and to receive a reception beam from the setting. The reception beam may be considered the transmission beam reflected from the scene.

The surveying instrument may further comprise a first camera having a first projection center, which has a first parallax shift relative to the instrument center, and a computer for controlling the body, the beam directing unit and the first camera. The surveying instrument is configured to perform a method as it is described herein.

The first camera may have a first focal length, based on which coordinates, in particular an elevation angle and an azimuth angle, may be assigned to each pixel value of the first camera.

The surveying instrument may comprise a second camera having a second projection center, which has a second parallax shift relative to the instrument center, wherein the computer may further be configured to control the second camera.

The surveying instrument according to the invention can be any surveying instrument configured to generate a three-dimensional point cloud, such as a total station, a theodolite or a laser scanner.

In the particular case the surveying instrument is embodied as a total station or theodolite, the beam directing unit comprises an emitting unit for providing the transmission beam, and a detection unit for detecting the reception beam.

In the particular case the surveying instrument is embodied as a laser scanner, the body comprises an emitting unit for providing the transmission beam, and a detection unit for detecting the reception beam. In said laser scanner, the beam directing unit is embodied as a deflector, in particular a mirror, which is configured to deflect the transmission beam from the emitting unit towards the setting, and to deflect the reception beam from the scene to the detection unit.

DESCRIPTION OF THE DRAWINGS

In the following, the invention will be described in detail by referring to exemplary embodiments that are accompanied by figures, in which.

DETAILED DESCRIPTION

Figure 1:
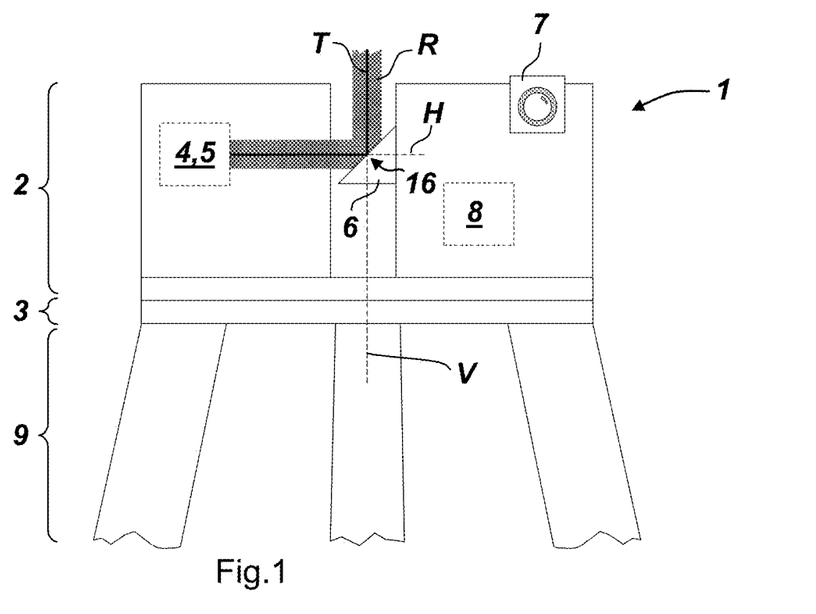
FIG. 1: shows one embodiment of a surveying instrument according to the invention, embodied as laser scanner.

FIG. 1 shows an exemplary surveying instrument 1 embodied as laser scanner configured to perform a method according to the invention. The surveying instrument comprises a body 2 and a base 3, optionally mounted on a tripod 9. A controlled, motorised relative rotation between body 2 and base 3 is provided around axis V. The body 2 comprises an emitting unit 4, a receiving unit 5, and a beam directing unit 6, wherein emitting unit 4 and receiving unit 5 are combined as one part in this example; they may however be embodied by according separate components, e.g. in combination with a beam splitter. The beam directing unit 6 is mounted in the body such that it is rotatable around an elevation axis H by a motor (not shown). While rotating, the directing unit 6 is deflecting a transmission beam T coming from the emitting unit 4 towards a setting, and a reception beam R coming back from the setting towards the receiving unit 5. At least one camera 7, in particular a wide-angle camera, panoramic camera, a spherical camera or similar, is comprised by the housing 2. The camera(s) may be mounted or attached to the housing or to the base 3 or to the tripod 9, as long as there is a defined or determinable pose (=position and orientation) difference between the scanner and the camera(s). The one or more cameras may in particular be incorporated in the housing. In the shown example, a computer 8 is comprised by the housing 2. The computer may, however, also be external to the laser scanner 1, e.g. embodied by a cloud computer having permanent wireless connection to the laser scanner. The computer 8 is configured to control the mentioned components of the surveying instrument and to perform the steps of the method according to the invention.

Figure 2:
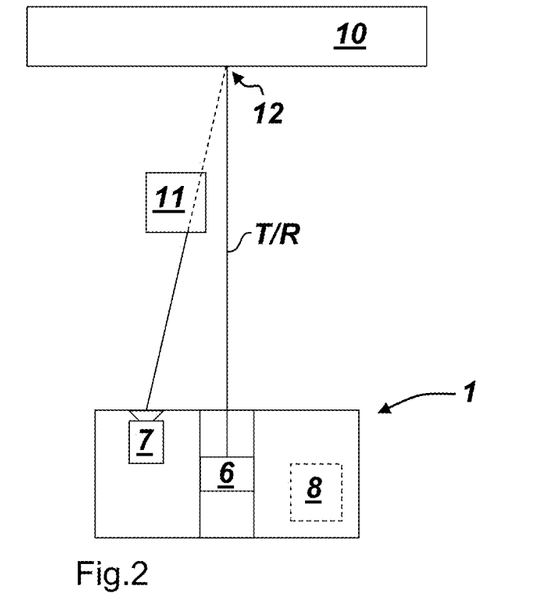
FIG. 2: shows a schematic drawing of the parallax problem solved by the invention.
Figure 3:
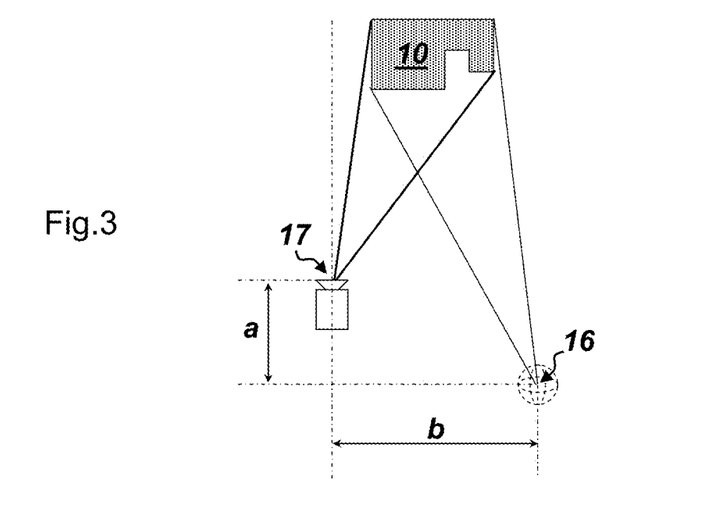
FIG. 3,4,5: illustrate the different perspectives of camera and surveying instrument caused by the parallax shift.

FIG. 2 shows the general problem of misassignment of a pixel to a point of a 3D point cloud. When the surveying instrument 1 targets an exemplary point 12 of the setting 10, and the camera 7 tries to capture the same point, it fails to do so due to an obstacle 11. Without the method according to the invention, a pixel of the obstacle 11 would be mistakenly assigned to the point 12.

This misassignment problem is caused by the parallax shift between the instrument center 16 of the surveying instrument, which may also be referred to as "nodal point" and defined as the origin of an instrument coordinate system (within which the point cloud is recorded), on the one hand and the projection center 17 of the camera, which is the vertex of the camera's angle of view (also referred to as entrance pupil or "no-parallax point") on the other hand. The parallax shift may be defined by line segments a, b and c (c is not shown because it is deemed perpendicular to a and b). So in the shown example, the parallax shift is two-dimensional (a,b), but of course it may be three-dimensional (a,b,c).

The parallax shift may also be defined by a line segment connecting the nodal point 16 and the projection center 17, wherein this connecting line segment may be expressed by a distance value, an azimuth angle and an elevation angle with reference to a coordinate system of the scanner that has the nodal point 16 as its origin.

Because the surveying instrument and the camera "perceive" the setting from different viewing angles, there may be points visible to one of them, but not to the other, and vice-versa. This is shown in FIGS. 4 and 5.

Figure 4:
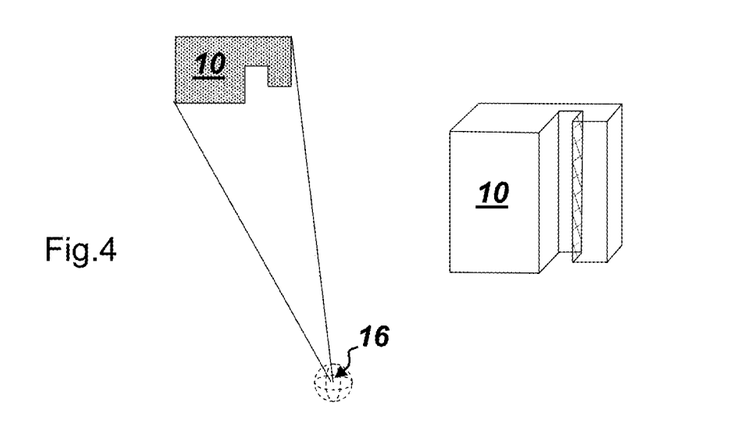

FIG. 4 shows how the setting 10 is captured by the surveying instrument from its instrument center 16. The shaded surface seen in the right part of FIG. 4 is not captured by the point cloud and therefore unknown to the surveying instrument.

Figure 5:
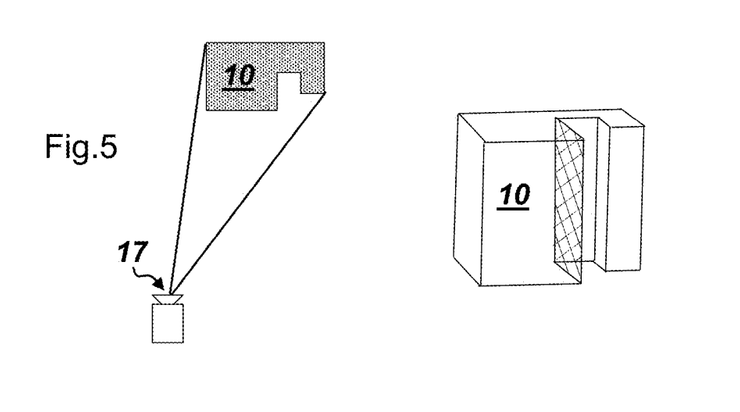

FIG. 5 shows how the same setting 10 is captured by the camera from its projection center 17. The shaded surface seen in the right part of FIG. 5 is not captured by the image and therefore unknown to the camera.

Figure 6:
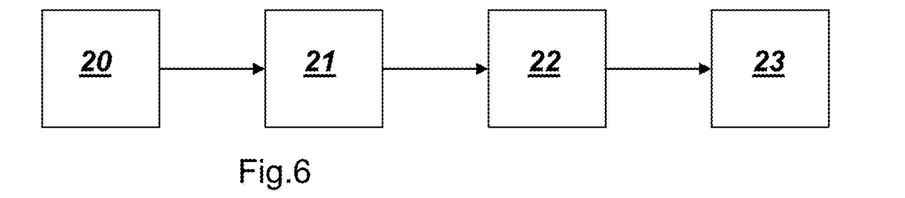
FIG. 6: shows the steps of a method according to the invention.

With reference to FIG. 6, the following steps are performed to avoid the wrong colourisation of the point cloud.

Step 20 is surveying a setting with a surveying instrument 1 in order to obtain a three-dimensional point cloud of the setting within a coordinate system that has the instrument center 16 of the surveying instrument 1 as its origin. For example, said instrument coordinate system may be a spherical coordinate system in which points are stored by two angles (elevation angle and azimuth angle) and a distance value. The angles are detected by angle encoders comprised by the surveying instrument 1. The elevation angle expresses the rotational position of the beam directing unit 6 about the horizontal axis H. The azimuth angle expresses the rotational position of the body 2 about the vertical axis V. The distance value is measured with a time-of-flight method, i.e. by sending out a transmission beam T and receiving a reception beam B, which is the reflected transmission beam T reflected from the setting. The time during transmission and reception is measured and a distance value is calculated out of it with help of knowledge of the speed of light.

Step 21 is capturing an image of the setting with a camera, in particular a same part of the setting of which the point cloud had been obtained. The position of the surveying instrument remains unchanged between surveying the point cloud and capturing the image. While it is not known how far away the objects of the setting in the image are (depth), with knowledge at least of the focal length and the position of the projection center 17 of the camera, alignment angles may be assigned to each pixel of the image. These alignment angles are also coordinates of a camera coordinate system that has the projection center 17 as its origin. Each pixel of the image, hence, may be assigned to an elevation angle and an azimuth angle within said camera coordinate system. Since distances cannot be derived from the image itself, the coordinates of the pixels only comprise said angles.

Step 22 is transforming the point cloud from the instrument coordinate system to the camera coordinate system. This may be performed by the computer 8, under knowledge of the parallax shift between the projection center 17 and the instrument center 16. The actual (absolute) shape of the point cloud is not altered. With transforming, a change of perspective is performed, from which the point cloud is "looked" at. That is, the origin now is not anymore the nodal point 17, but rather the projection center 16.

Step 23 is assigning to each point of the point cloud which is openly, i.e. directly, visible from the new perspective (projection center 17) a pixel which has corresponding coordinates. The openly visible uncovered points may be detected by a detection algorithm which may use plane detection, feature detection or object detection. Since a point cloud does not have "filled" walls or planes, but rather is porous, of course points may be, so to speak, "visible" while practically being located behind an obstacle. Therefore, said detection algorithm may take account of the features of the point cloud in order to detect, what will cover a point and what will not, when the change of perspectives is performed. The detection algorithm may also take into account an image taken with the camera.

Corresponding coordinates means that a pixel and a point have the same or essentially the same elevation angle and the same azimuth angle with respect to the projection center 17.

As a result of step 23, those points which are non-visible from the projection center 17 will not be assigned to a pixel value, such that they remain uncoloured at first. Only the ones visible from the projection center 17 will be colourised and those points of the point cloud which are covered from the cameras point of view are disregarded.

In a further optional step (not shown in FIG. 6), those non-visible (covered) points may be coloured nevertheless:

The computer 8 may determine a substitute pixel value to be assigned to the non-visible point, based on one of the pixels assigned to points adjacent to the non-visible point. In particular this determination may use at least one of: plane detection, feature detection, material detection, or object surface detection (e.g. based on Signal-to-Noise analysis of the reception beam R and/or the transmission beam T), and image processing.

Figure 7:
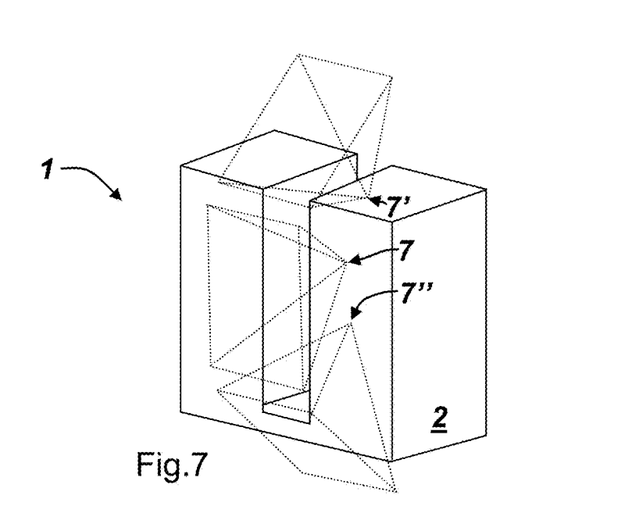
FIG. 7,8: show further exemplary embodiments of a surveying instrument according to the invention having multiple cameras.
Figure 8:
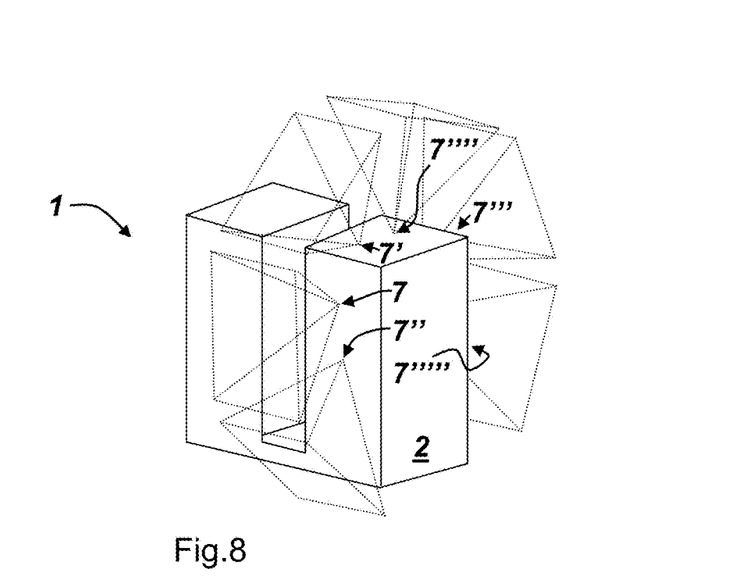

FIGS. 7 and 8 show multiple cameras 7 comprised by the body 2 of the laser scanner 1 which are heading in different directions thereby providing a wide angle view (up to a 360 degree view) when the images are merged. Each camera 7 constitutes its own camera coordinate system with their according projection centers as origins. The steps 20, 21, 22, 23 and further optional steps explained in this application may be performed for each of the multiple cameras.

Usually the image data acquisition is an additional step to surveying a 3D point cloud. It is a time consuming task which has to be as fast as possible. At the same time a high resolution imaging data and good image quality are desirable.

A surveying instrument according to the present invention provides a high resolution, high quality image and is nevertheless very fast taking all needed images. This can be accomplished by using more than one camera. The cameras are placed in a way to cover the needed vertical field of view (e.g. 160°) and a horizontal field of view as large as possible.

With this setting the scanner can reduce the pointing directions which have to be taken by the factor of the number of cameras used.

Figure 9:
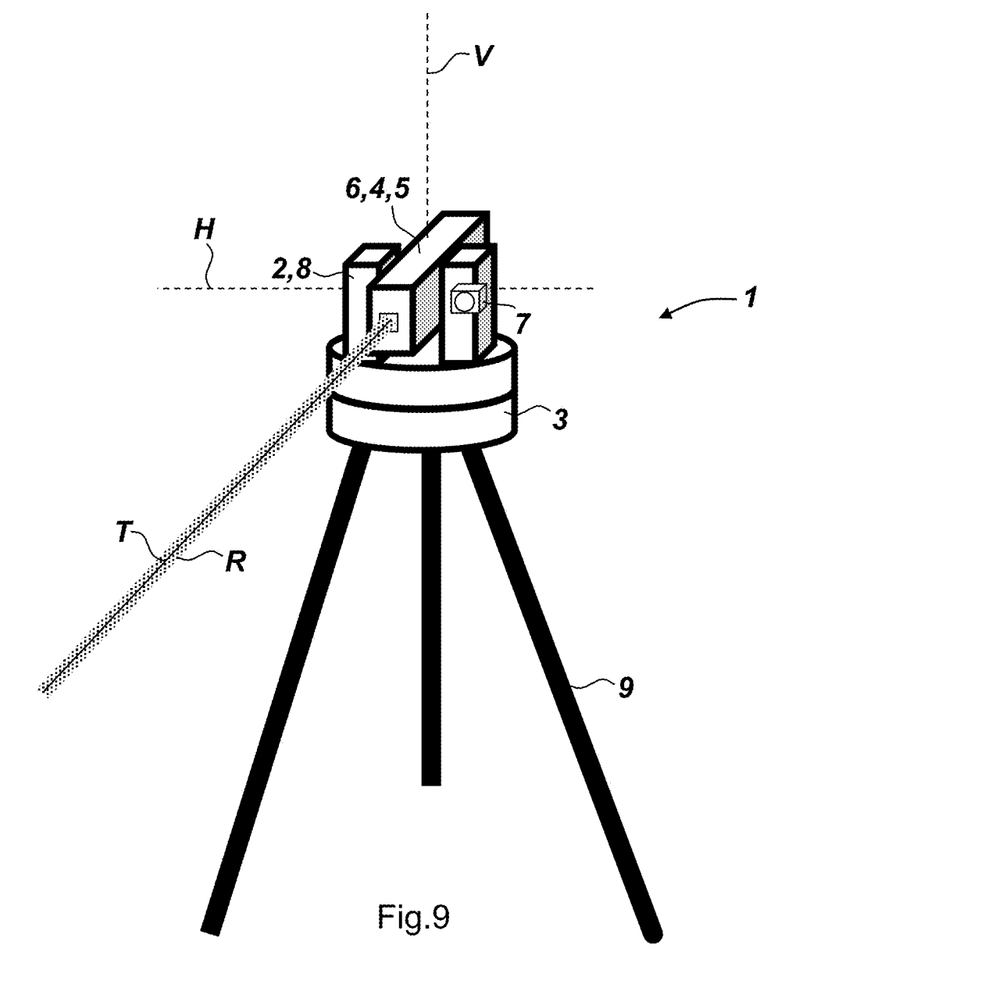
FIG. 9: shows an embodiment of the surveying instrument according to the invention.

FIG. 9 shows a surveying instrument according to the invention, embodied as a theodolite, having a base 3 on which a body 2 is mounted such that it is rotatable about an azimuth axis V. A beam directing unit 6 is mounted in the body 2 such that it is rotatable about an elevation axis H. A camera 7 may be attached to or integrated in the theodolite 1. The beam directing unit 6 may comprise an emitting unit 4 for providing a transmission beam T and a detection unit 5 for detecting a reception beam R.

A computer 8 for controlling the components of the theodolite 1 and for perform a method according to the present invention is comprised by the theodolite 1, e.g. within the body 2 (as shown).

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for colourising a three-dimensional point cloud, the method comprising:
   with a surveying instrument, surveying a point cloud of a setting by using a laser beam and associating a distance measured with the laser beam with an alignment of the laser beam under which the distance was measured, wherein each point of said point cloud is characterised by coordinates within an instrument coordinate system, which has an instrument center as an origin, the instrument center being defined by a crossing point of an azimuth axis and the elevation axis of the surveying instrument;
   with a first camera of the surveying instrument, capturing a first image of the setting, wherein each pixel value of the first image is assigned to coordinates within a first camera coordinate system, which is provided with respect to a first projection center defining a perspective of the first camera onto the setting, wherein the first projection center has a first parallax shift relative to the instrument center;
   transforming, with a computer, the point cloud from the instrument coordinate system into the first camera coordinate system, resulting in a first transformed point cloud,
   within the first transformed point cloud, discriminating between uncovered points, which are openly visible from the perspective of the first projection center, and covered points, which are non-visible from the perspective of the first projection center due to the first parallax shift, to each uncovered point in the first transformed point cloud, assigning a pixel value, which has corresponding coordinates in the first camera coordinate system, and to each covered point in the first transformed point cloud, assigning a substitute pixel value, which is determined based on a pixel value assigned to a point adjacent to the covered point of the first transformed point cloud, wherein the point cloud is surveyed by means of the laser beam and the substitute pixel value is determined based on a property derived from a reflected part of the laser beam, wherein the substitute pixel value is determined by use of a signal-to-noise ratio provided by the reflected part of the laser beam.

2. The method according to claim 1, further comprising:

with a second camera comprised by the surveying instrument, capturing a second image of the setting, wherein each pixel value of the second image is assigned to coordinates within a second camera coordinate system, which has a second projection center as origin, wherein the second projection center has second parallax shift relative to the instrument center, transforming the point cloud from the instrument coordinate system into the second camera coordinate system, resulting in a second transformed point cloud, within the second transformed point cloud, detecting one or more uncovered points, which are openly visible from the perspective of the second projection center, to each uncovered point in the second transformed point cloud, assigning a pixel value, which has corresponding coordinates in the second camera coordinate system.

3. The method according to claim 2, comprising:

within the second transformed point cloud, detecting one or more covered points, which are non-visible from the perspective of the second projection center due to the second parallax shift, and to each covered point of the second transformed point cloud, assigning a substitute pixel value, which is determined based on a pixel value assigned to a point adjacent to the covered point of the second transformed point cloud.

4. The method according to claim 1, further comprising:

with a second camera comprised by the surveying instrument, capturing a second image of the setting, wherein each pixel value of the second image is assigned to coordinates within a second camera coordinate system which has a second projection center as origin, wherein the second projection center has second parallax shift relative to the instrument center; and transforming the point cloud from the instrument coordinate system into the second camera coordinate system, resulting in a second transformed point cloud, within the first transformed point cloud, detecting one or more covered points, which are non-visible from the perspective of the first projection center due to the first parallax shift, within the second transformed point cloud, determining corresponding points of said one or more covered points of the first transformed point cloud, within the corresponding points, detecting one or more uncovered corresponding points, which are openly visible from the perspective of the second projection center, and to each covered point in the first transformed point cloud, of which an uncovered corresponding point exists in the second transformed point cloud, assigning a pixel value of the second image that has corresponding coordinates with the uncovered corresponding point of the second transformed point cloud.

5. The method according to claim 1, wherein at least one of the first camera and a second camera is one of a wide angle camera, a panoramic camera, and a spherical camera.

6. The method according to claim 2, wherein at least one of the coordinates of the pixel values, the coordinates of the points of the point cloud, the coordinates of the points of the first transformed point cloud, and the coordinates of the points of the second transformed point cloud comprise at least an elevation angle and an azimuth angle.

7. The method according to claim 2, wherein at least one of the coordinates of the points of the point cloud, the coordinates of the points of the first transformed point cloud, and the coordinates of the points of the second transformed point cloud comprise an elevation angle, an azimuth angle and a distance value.

8. The method according to claim 1, wherein each pixel value of the first image is assigned to coordinates within the first camera coordinate system based at least on a focal length of the first camera.

9. The method according to claim 2, wherein each pixel value of the second image is assigned to coordinates within the second camera coordinate system based at least on a focal length of the second camera.

10. The method according to claim 1, wherein at least one of the uncovered points and the covered points are detected based on a detection algorithm using one of 3D point projection, plane detection, feature detection and object detection.

11. The method according to claim 1, wherein the surveying instrument is configured for generating point clouds, wherein each point of the point clouds is characterised by coordinates within the instrument coordinate system having the instrument center as the origin, the surveying instrument comprising:

a base;

a body mounted on the base such that the body is rotatable relative to the base about an azimuth axis;

a beam directing unit mounted in the body such that the beam directing unit is rotatable relative to the body about an elevation axis, wherein the beam directing unit is configured to:

direct a transmission beam towards the setting, and receive a reception beam from the setting;

the first camera having a first projection center, which has the first parallax shift relative to the instrument center, the first camera being configured to capture the first image of the setting, wherein each pixel value of the first image is assigned to coordinates within the first camera coordinate system, which has the first projection center as origin, wherein the first projection center has the first parallax shift relative to the instrument center; and the computer is configured to the body, the beam directing unit and the first camera, the computer being configured to:

transform the point cloud from the instrument coordinate system into the first camera coordinate system, resulting in the first transformed point cloud, within the first transformed point cloud, detecting one or more uncovered points, which are openly visible from the perspective of the first projection center, to each uncovered point in the first transformed point cloud, assigning a pixel value, which has corresponding coordinates in the first camera coordinate system.

12. The method according to claim 11, wherein the first camera has a first focal length, based on which coordinate are assigned to each pixel value of the first camera.

13. The method surveying instrument according to claim 11, further comprising:
a second camera having a second projection center, which has a second parallax shift relative to the instrument center,
wherein a computer is further configured to control the second camera.

14. The method surveying instrument according to claim 11, wherein the body comprises:
an emitting unit for providing the transmission beam;
a detection unit for detecting the reception beam;
wherein the beam directing unit is embodied as a deflector, which is configured to:
deflect the transmission beam from the emitting unit towards the setting, and
deflect the reception beam from the scene to the detection unit.

15. A surveying instrument for generating a point cloud of a setting by using a laser beam and associating a distance measured with the laser beam with an alignment of the laser beam under which the distance was measured, wherein each point of said point cloud is characterised by coordinates within an instrument coordinate system, which has an instrument center as an origin, the instrument center being defined by a crossing point of an azimuth axis and the elevation axis of the surveying instrument, wherein the surveying instrument comprises:
a camera configured to capture an image of the setting, wherein each pixel value of the image is assigned to coordinates within a camera coordinate system, which is provided with respect to a projection center defining a perspective of the camera onto the setting, wherein the first projection center has a parallax shift relative to the instrument center, and
a computer,
wherein the surveying instrument is configured for generating the point cloud and, with the computer:
transforming the point cloud from the instrument coordinate system into the camera coordinate system, resulting in a transformed point cloud,
within the transformed point cloud, discriminating between uncovered points, which are openly visible from the perspective of the projection center, and covered points, which are non-visible from the perspective of the projection center due to the parallax shift,
to each uncovered point in the transformed point cloud, assigning a pixel value, which has corresponding coordinates in the camera coordinate system, and
to each covered point in the transformed point cloud, assigning a substitute pixel value, which is determined based on a pixel value assigned to a point adjacent to the covered point of the first transformed point cloud, wherein the point cloud is surveyed by means of the laser beam and the substitute pixel value is determined based on a property derived from a reflected part of the laser beam, wherein the substitute pixel value is determined by use of a signal-to-noise ratio provided by the reflected part of the laser beam.

16. The method according to claim 1, wherein the point cloud is surveyed by means of the laser beam and the substitute pixel value is determined based on a property derived from a reflected part of the laser beam.

17. The method according to claim 1, wherein the substitute pixel value is determined by use of at least one of an intensity and a distance provided by the reflected part of the laser beam.

* * * * *